Aug. 18, 1970     R. M. BUCHWALD     3,524,359
ACCESSORY DRIVE
Filed Nov. 25, 1968     2 Sheets-Sheet 1
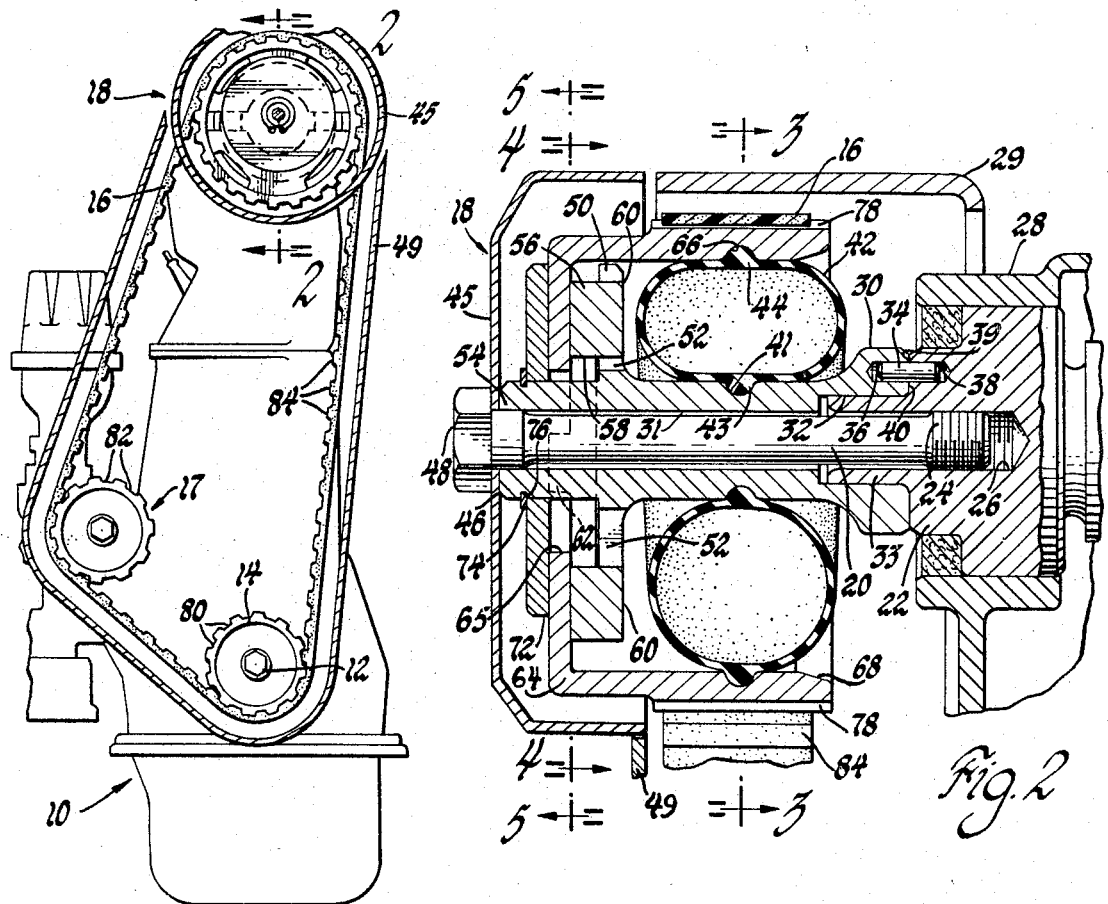
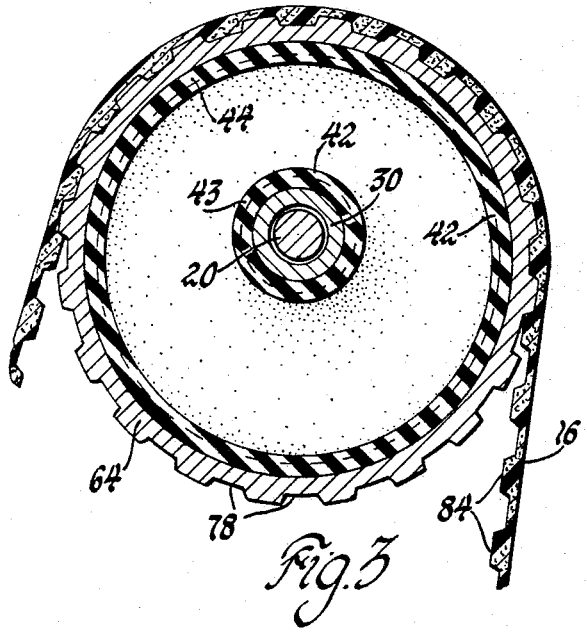
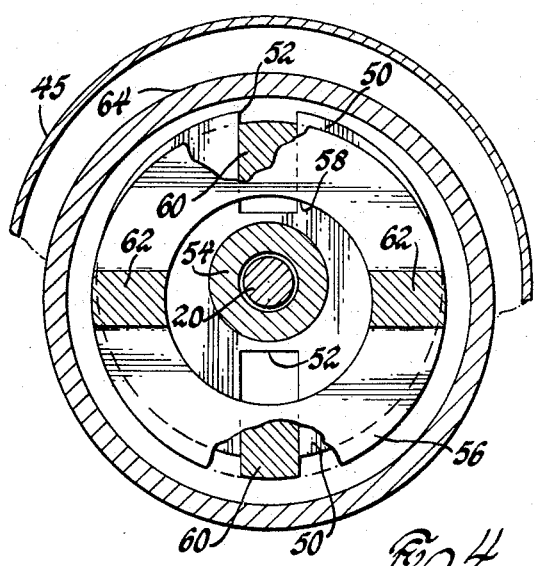
INVENTOR.
Robert M. Buchwald
BY
a. M. Heiter
ATTORNEY Aug. 18, 1970  R. M. BUCHWALD  3,524,359
ACCESSORY DRIVE Filed Nov. 25, 1968  2 Sheets-Sheet 2

INVENTOR.
Robert M. Buchwald
BY
a. M. Heiter
ATTORNEY

United States Patent Office 3,524,359
Patented Aug. 18, 1970

---

3,524,359
ACCESSORY DRIVE
Robert M. Buchwald, Birmingham, Mich., assignor to General Motors Corporation, Detroit, Mich., a corporation of Delaware
Filed Nov. 25, 1968, Ser. No. 778,465
Int. Cl. F16h 7/02, 7/14
U.S. Cl. 74—219   8 Claims

ABSTRACT OF THE DISCLOSURE

The accessory drive transmission shown embodies a cup-shaped camshaft sprocket axially located and radially slidably mounted on a member which is fixedly secured to the camshaft for rotation therewith. An inflated tube or "doughnut" is axially located on the member within the cup-shaped sprocket such that one side thereof is compressed by the sprocket once a belt is mounted on the sprocket, the compressed tube serving to continually and automatically urge the sprocket radially outwardly against the belt, thereby providing a means for tensioning the belt throughout the operational life thereof.

---

This invention relates to accessory drive transmissions for automotive vehicles and more particularly to transmissions which include means for automatically providing belt tensioning.

While various means have been used heretofore to virtually eliminate the need for retensioning accessory drive belts once installed, for example, glass fiber reinforcing, it is, nevertheless, desirable to provide means for an automatic tensioning of belts to accommodate variations in drive shaft and driven shaft center distances, as well as in belt lengths.

A general object of the invention is to provide an accessory drive transmission which is driven by the crankshaft of the engine and which is operable to provide automatic belt tensioning.

Another object of the invention is to provide an accessory drive transmission which includes means for varying the location of the center of rotation of the sprocket to accommodate variation in drive and driven shaft center distances and belt lengths, while the pitch diameter of the belt sprocket remains fixed.

A further object of the invention is to provide a slidably mounted pulley sprocket which is radially movable with respect to the center of the shaft which it drives, the same being urged toward the shaft by a drive belt and away from the shaft by an inflated doughnut-shaped tube.

A more specific object of the invention is to provide an accessory drive transmission including a pneumatic tube or "doughnut" mounted on an accessory drive shaft or an extension thereof, the tube being inflated to a predetermined pressure and compressed on one side thereof by a radially slidable sprocket at the time a drive belt is installed on the sprocket, and thereafter exerting sufficient force to continually and automatically urge the sprocket radially outwardly against the belt to maintain a predetermined belt tension therein.

Other objects and advantages will become more apparent when reference is made to the following description and accompanying drawings wherein:

FIG. 1 is an end view in partial cross section of an engine embodying the invention;

FIG. 2 is a cross-sectional view taken along the plane of the line 2—2 of FIG. 1, and looking in the direction of the arrows;

FIG. 3 is a cross-sectional view taken along the plane of the line 3—3 of FIG. 2, as if FIG. 2 were a full round view, and looking in the direction of the arrows;

FIG. 4 is a cross-sectional view taken along the plane of line 4—4 of FIG. 2, as if FIG. 2 were a full round view, and looking in the direction of the arrows;

Figure 5:
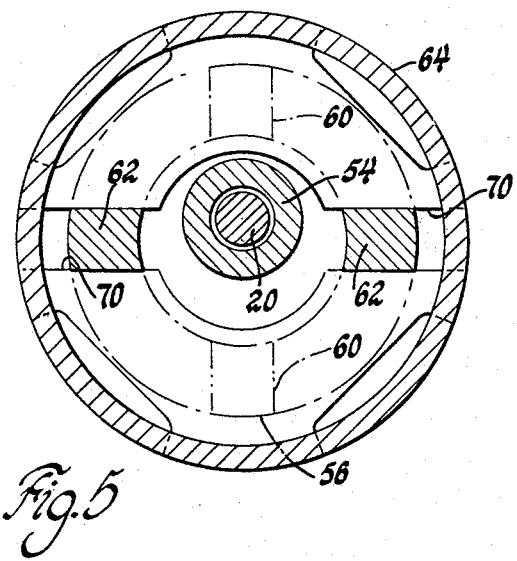
FIG. 5 is a cross-sectional view taken along the plane of the line 5—5 of FIG. 2, as if FIG. 2 were a full round view, and looking in the direction of the arrows.

Referring now to the drawings in greater detail, FIG. 1 illustrates an engine 10 including a crankshaft 12 with a drive sprocket 14 mounted thereon, and a belt 16, which may consist of a neoprene material, connecting the drive sprocket 14 to various accessory drive transmissions, such as, for example, the generator transmission 17 and the camshaft transmission 18, the transmission 17 being such that it has a 1:1 speed ratio with respect to the drive sprocket 14, and the transmission 18 having a 2:1 speed ratio therewith.

For purposes of illustration, the invention is incorporated in the camshaft transmission 18, as will now be explained with reference to FIG. 2. The transmission 18 includes a transmission shaft 20 threadedly connected to a camshaft 22 via a threaded end 24 formed on the former and a threaded opening 26 formed in the latter, for the purpose of rotating the camshaft 22 and its associated cams (not shown) at a fixed speed ratio with respect to the speed of the crankshaft 12. The camshaft 22 is rotatably confined within an overhead cam cover 28 and an associated shroud 29.

Figure 6:
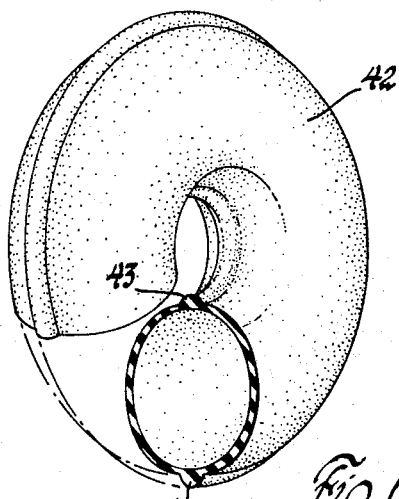
FIG. 6 is a perspective view of a portion of FIG. 2.

A stepped center mount 30 includes an axial passage 31 and a counterbored end 32 which are slidably mounted on the transmission shaft 20 and on an extension 33, respectively, the latter extending from the end of the camshaft 22. The camshaft 22 is fixed for rotation with the center mount 30 by means of pins 34 press-fitted into openings 36 and 38 formed in the mating faces 39 and 40 of the center mount 30 and the camshaft 22, respectively. A circumferential groove 41 is formed on the center mount 30, intermediate the ends thereof. An inflated expandable tube or "doughnut" 42 (FIGS. 2 and 6) having circumferential ribs 43 and 44 formed on the inner and outer surfaces thereof, respectively, is mounted on the center mount 30 with its inner rib 43 aligned in the groove 41.

Figure 7:
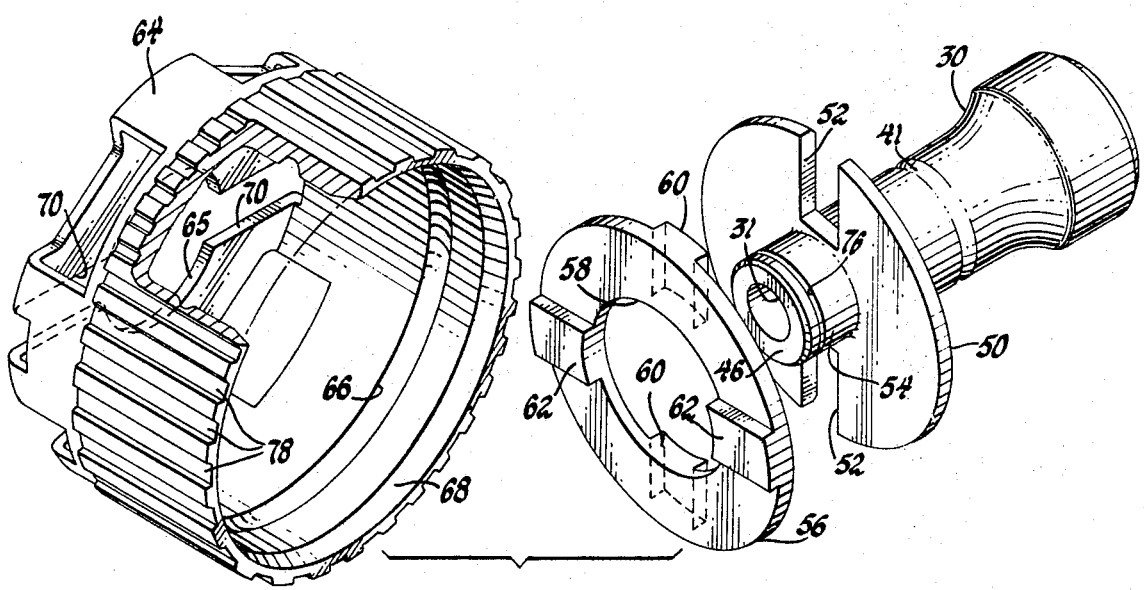
FIG. 7 is a partial exploded view of a portion of FIG. 2.

A rotating circular shroud 45 is confined between the end face 46 of the center mount 30 and a bolt head 48 formed on the transmission shaft 20 to cover the transmission 18. A stationary shroud 49 covers the drive sprocket 14 and the generator sprocket 17 and is positioned such that the upper edge thereof is closely adjacent the rotating shroud 45, as illustrated in FIG. 2. A flange 50, including two oppositely disposed rectangular slots 52 formed thereon (FIGS. 2, 4 and 7), is formed on the center mount 30 near the outer end 46 thereof, a portion 54 of the center mount 30 extending beyond the flange 50.

A washer 56 having an axial opening 58 formed therein is mounted around the end portion 54 adjacent the flange 50, the opening 58 being larger in diameter than the end portion 54. A pair of oppositely disposed protrusions 60 (FIG. 7) are formed on the side of the washer 56 which is in contact with the flange 50, the respective sizes of the protrusions 60 and the slots 52 being such that the protrusions 60 form a radially slidable fit within the rectangular slots 52. A second pair of oppositely disposed protrusions 62 (FIG. 7) are formed on the opposite side of the washer 56, each of which is located equal arc lengths away from the radial position of the protrusions 60.

A cup-shaped sprocket 64 having an end opening 65 and an inner circumferential slot or groove 66 formed thereon, is loosely mounted around the end portion 54 of the center mount 30 with its large open end 68 extending past the washer 56, the flange 50 and the inflated doughnut 42, toward the overhead cam cover 28, the circumferential groove 66 aligning with the rib 44 of the doughnut 42. A pair of oppositely disposed slots 70 (FIG. 7) extend radially outwardly from the opening 65 of the sprocket 64 for alignment with and insertion of the protrusions 62 of the washer 56. The inner end face of the sprocket 64 is held against the left face (FIG. 2) of the washer 56 by means of an end plate 72, which, in turn, is held against the outer end face of the sprocket 64 by a retaining ring 74 fitted into a groove 76 formed on the end portion 54 of the center mount 30. While axial alignment is thus maintained, the location of the retaining ring 74 and the respective thicknesses of the members 56, 64 and 72 are such that radial movement of the sprocket 64 and the washer 56 is possible.

A plurality of equally spaced longitudinal grooves or slots 78 are formed on the outer periphery of the sprocket 64 adjacent the large open end 68. Similar longitudinal slots 80 and 82 are formed on the outer peripheries of the sprockets 14 and 17, respectively.

The flexible belt 16 includes laterally spaced bosses or projections 84 formed on its inner surface. When installed, the bosses 84 mesh with the slots 78, 80 and 82 of the sprockets 64, 14 and 17, respectively, suitable for driving the sprockets 64 and 17 in response to rotation of the crankshaft pulley 14, in a direct speed ratio therewith, as explained above.

As indicated above, the axial openings 58 and 65 of the washer 56 and the cup-shaped sprocket 64, respectively, are substantially larger in diameter than the outer diameter of the center mount 30. As such, it is apparent the members 56 and 64 may be moved radially with respect to center mount 30 and its associated flange 50, the oppositely disposed radial protrusions 60 being radially slidably fitted within the oppositely disposed slots 52 of the flange 50, as explained above.

In view of the above, it should now be apparent that the sprocket 64 may be installed against the washer 56 with the inflated tube or doughnut 42 in a slightly compressed, full round condition with respect to the center mount 30, and with the rib 44 and the groove 66 in mesh with one another. After initially mounting the washer 56, the sprocket 64, the end plate 72, and the retaining ring 74 concentrically on the center mount 30, the washer 56 and the sprocket 64 may be manually forced downwardly in FIGS. 1 and 2, thereby compressing the upper portion of the doughnut 42, the location of the flange 50 being far enough away from the groove 66 that the compressed doughnut will not contact it as a result of the lateral expansion thereof. The belt 16 is then placed around the sprockets 14, 17 and 64, with the projections 84 thereof aligned in the slots 80, 82 and 78, respectively. It is apparent that the preselected overall circumferential length of the belt 16 may be such that it holds the inflated doughnut 42 in the compressed state just described.

Assembly in this manner will automatically compensate for variations in belt 16 length and/or variable distances between the crankshaft 12, the shaft of the fixed generator sprocket 17, and the camshaft 22. Additionally, should the belt 16 stretch during its operational lifetime, the inflated doughnut 42 will inherently seek to resume its original full round condition and, accordingly, will urge the sprocket 64 upwardly in FIGS. 1 and 2, thereby keeping the belt 16 taut at all times, serving as a fully automatic belt tensioning device.

It should be apparent that the belt tensioning device may be employed with transmissions other than the camshaft transmission 18 and that the member 64 may include other wheel members, such as a pulley, for example.

While only one embodiment of the invention has been disclosed and described, it is apparent that other modifications thereof are possible.

I claim:
1. A drive device comprising a drive shaft for use in a drive mechanism, annular rigid wheel means longitudinally aligned with and surrounding said drive shaft, means on said drive shaft and said wheel means for positively drive-connecting said wheel means to said drive shaft for drive-transmitting rotation therewith and providing for transversely slidable movement of said wheel means relative to the axis of said drive shaft, a drive means, endless drive-transmitting means operatively connected between said drive means and said wheel means for transmitting a drive between said drive means and said wheel means and biasing said wheel means transversely of said axis, and annular resilient means interposed between and contacting said drive shaft and said wheel means for resiliently urging said wheel means radially outwardly against said drive-transmitting means toward a position coaxial with said drive shaft, thereby continually and automatically tensioning said drive-transmitting means.

2. A drive transmission to be operatively connected to a driving means, said transmission comprising a driven shaft for actuating a driven mechanism, wheel means longitudinally aligned on said driven shaft and transversely slidable on fixed drive means for positively driving said driven shaft, inflated and compressed means interposed between said driven shaft and the inner surface of said wheel means, and endless drive-transmitting means mounted on the outer surface of said wheel means for rotating said driven shaft in response to rotation of said drive-transmitting means, said endless drive-transmitting means urging said transversely slidable wheel means inwardly toward the axis of said drive-transmitting means against the outward pressure of said inflated and compressed means, and said inflated and compressed means urging said transversely slidable wheel means outwardly from said axis of said drive-transmitting means against said drive-transmitting means, thereby automatically compensating for variations in distance between drive-transmitting means and driven shaft centers and continually tensioning said drive-transmitting means.

3. A accessory drive transmission for an automotive engine having a crankshaft with drive wheel means mounted thereon, a driven accessory shaft and a cogged endless belt mounted on said drive wheel means for driving said driven shaft, said accessory drive transmission comprising a member adapted to be fixedly secured to said driven accessory shaft for rotation therewith, radial positioning means axially aligned on said member, retaining means operatively connected to said member and said radial positioning means in axial alignment on said member, an exteriorly slotted driven wheel means operatively connected to said radial positioning means for radial movement therewith relative to said member, said cogged endless belt being adapted to be mounted on said exteriorly slotted driven wheel means so as to transversely move the surface of said driven wheel means which is in contact with said endless belt toward said member, and annular resilient means mounted on said member and adapted to be compressed adjacent said contacting surface within said exteriorly slotted driven wheel means by the addition of said cogged endless belt.

4. An accessory drive device comprising a driving shaft, first wheel means mounted on said driving shaft for rotation therewith, a driven shaft for actuating an accessory mechanism, and an accessory drive transmission including second wheel means longitudinally aligned and transversely movable with respect to said driven shaft, annular inflated and compressed means interposed between said driven shaft and the inner portion of said second wheel means, and a belt mounted on said first and second wheel means to be rotated by said driving shaft for rotating said driven shaft, said belt urging said transversely movable second wheel means inwardly toward said first wheel means against the outward pressure of said annular inflated and compressed means, and said annular inflated and compressed means urging said transversely movable second wheel means outwardly from said first wheel means against said belt, thereby automatically compensating for variations in drive and driven shaft center distances and continually tensioning said belt.

5. An accessory drive transmission comprising a driving shaft, means for rotating said driving shaft, a driven shaft for actuating an accessory mechanism, a drive sprocket mounted on said driving shaft for rotation therewith, an extension member fixedly secured at one end thereof to said driven shaft for rotation therewith, a flange formed on said extension member adjacent the free end thereof, a cup-shaped driven sprocket operatively connected to said flange, means associated with said driven sprocket and said flange for permitting said driven sprocket to move transversely relative to the axis of said extension member, retainer means for maintaining the axial location of said driven sprocket with respect to said flange while permitting said transverse movement of said driven sprocket, a pneumatic compressible tube located axially on said extension member and circumferentially compressed thereon within said cup-shaped driven sprocket, and a belt mounted on said drive and driven sprockets to be rotated by said driving shaft for rotating said driven shaft, said belt having a length sufficient to cause said driven sprocket to further compress said pneumatic compressible tube at the side thereof exterior said driving and driven shafts, said tube thereby serving to continually urge said driven sprocket toward said belt.

6. The accessory drive transmission described in claim 5, wherein said means for permitting transverse movement of said driven sprocket includes a washer having oppositely disposed protrusions formed on each face thereof, and respective mating radial slots formed in said flange and in said cup-shaped driven sprocket, said driven sprocket thereby being able to be urged transversely inwardly by said belt and simultaneously urged transversely outwardly by said compressed tube.

7. A drive device comprising a driving shaft and at least one driven shaft, driving means for driving said driving shaft, wheel means operatively connected to each of said shafts, an endless drive-transmitting means mounted around said plurality of wheel means, means operatively connected to one of said shafts and its associated wheel means for permittting said associated wheel means to move transversely relative to the axis of said one of said shafts, said means including a member fixedly secured to said one of said shafts, and mating projections and slots formed on said member and said associated wheel means, said projections being free to slide radially along said slots, and annular inflated means interposed between said one of said shafts and said associated wheel means for urging said associated wheel means against said endless drive-transmitting means, thereby continually automatically tensioning said endless drive-transmitting means.

8. The device described in claim 7, wherein said annular inflated means is a molded rubber tube.

References Cited

UNITED STATES PATENTS

| 586,596 | 7/1897 | Dederick | 74—230.18 XR |
| 2,119,395 | 5/1938 | Locke | 74—230.18 |
| 3,216,267 | 11/1965 | Dolza | 74—219 |

JAMES A. WONG, Primary Examiner

U.S. Cl. X.R.

74—230.4, 242.11